US011542182B2

(12) United States Patent
Imachi et al.

(10) Patent No.: US 11,542,182 B2
(45) Date of Patent: Jan. 3, 2023

(54) HYDROGEN-CONTAINING WATER GENERATOR (71) Applicant: THE CHUGOKU ELECTRIC POWER CO., INC., Hiroshima (JP)

(72) Inventors: Masahiro Imachi, Hiroshima (JP); Hiroaki Tanigawa, Hiroshima (JP); Norihiro Okubo, Hiroshima (JP)

(73) Assignee: THE CHUGOKU ELECTRIC POWER CO., INC., Hiroshima (JP)

(*) Notice: Subject to any disclaimer, the term of this patent is extended or adjusted under 35 U.S.C. 154(b) by 22 days.

(21) Appl. No.: 17/269,482

(22) PCT Filed: Aug. 29, 2018

(86) PCT No.: PCT/JP2018/031998
§ 371 (c)(1),
(2) Date: Feb. 18, 2021

(87) PCT Pub. No.: WO2020/044472
PCT Pub. Date: Mar. 5, 2020

(65) Prior Publication Data
US 2021/0300798 A1 Sep. 30, 2021

(51) Int. Cl.
C02F 1/461 (2006.01)
(52) U.S. Cl.
CPC ........ C02F 1/4618 (2013.01); C02F 1/46109 (2013.01); C02F 2001/46171 (2013.01); C02F 2201/46105 (2013.01)
(58) Field of Classification Search
CPC ........... C25B 9/015; C02F 2001/46171; C02F 2001/46157–46161
(Continued)

(56) References Cited

U.S. PATENT DOCUMENTS 3,378,479 A * 4/1968 Colvin .................... C25B 15/00
204/276
3,558,465 A * 1/1971 Colvin .................. C02F 1/4674
204/292
(Continued)

FOREIGN PATENT DOCUMENTS

JP 2006-095511 A 4/2006
JP 2006-198562 A 8/2006
(Continued)

OTHER PUBLICATIONS

Oct. 2, 2018 International Search Report issued in International Patent Application No. PCT/JP2018/031998.
(Continued)

Primary Examiner — Harry D Wilkins, III
(74) Attorney, Agent, or Firm — Oliff PLC (57) ABSTRACT A hydrogen-containing water generator includes a cathode portion of cylindrical shape that has a plurality of openings in a side thereof, an anode portion of cylindrical shape that is provided radially outside the cathode portion and has a plurality of openings in a side thereof, an electrolytic vessel that is transparent, has a cylindrical shape, and is internally provided with the cathode portion and the anode portion, a water supply part that supplies water into the cathode portion from one end side of the cathode portion; and a drain part that drains water inside the electrolytic vessel from the other end side of the cathode portion.

2 Claims, 8 Drawing Sheets

(58) Field of Classification Search
USPC .......................................................... 204/272
See application file for complete search history.

(56) References Cited

U.S. PATENT DOCUMENTS

| | | | | |
|---|---|---|---|---|
| 5,082,544 | A | * | 1/1992 | Willey ...................... C25B 9/17 |
| | | | | 204/278 |
| 2007/0029201 | A1 | * | 2/2007 | Suominen ................ C02F 1/465 |
| | | | | 204/555 |
| 2008/0053822 | A1 | * | 3/2008 | Miyahara ................ C02F 1/463 |
| | | | | 204/272 |
| 2009/0314651 | A1 | | 12/2009 | Field |
| 2011/0042203 | A1 | * | 2/2011 | McAlister ............... F02B 43/08 |
| | | | | 204/238 |
| 2015/0360976 | A1 | * | 12/2015 | Iwai .......................... C02F 1/46 |
| | | | | 204/272 |

FOREIGN PATENT DOCUMENTS

| | | |
|---|---|---|
| JP | 2007-144305 A | 6/2007 |
| JP | 2008-43891 A | 2/2008 |
| JP | 2010-88973 A | 4/2010 |
| JP | 2011-525146 A | 9/2011 |
| JP | 2014-147884 A | 8/2014 |
| JP | 2016-22469 A | 2/2016 |
| KR | 10-2005-0086082 A | 8/2005 |
| KR | 10-2016-0148055 A | 12/2016 |
| KR | 10-1781465 B1 | 10/2017 |

OTHER PUBLICATIONS

Jan. 29, 2019 Japanese Notice of Reasons for Refusal issued in Japanese Patent Application No. 2018-565434.
Apr. 2, 2019 Japanese Notice of Reasons for Refusal issued in Japanese Patent Application No. 2018-565434.
Jul. 2, 2019 Japanese Notice of Reasons for Refusal issued in Japanese Patent Application No. 2018-565434.
Aug. 27, 2019 Japanese Decision to Grant a Patent for Japanese Patent Application No. 2018-565434.
Oct. 27, 2022 Office Action issued in Korean Application No. 10-2021-7005339.

* cited by examiner

HYDROGEN-CONTAINING WATER GENERATOR

CROSS-REFERENCE TO RELATED APPLICATION

This application is a National Stage of PCT international application Ser. No. PCT/JP2018/031998 filed on Aug. 29, 2018 which designates the United States, incorporated herein by reference.

FIELD

The present disclosure relates to a hydrogen-containing water generator.

BACKGROUND

There is known a technique of generating hydrogen-containing water that is water containing hydrogen, from raw water such as tap water by using water electrolysis action. For example, Patent Literature 1 describes a hydrogen-containing water generator that uses a cylindrical electrode unit having a plurality of openings in the side thereof to increase the electrolytic surface area, improving efficiency in dissolution of hydrogen in raw water.

CITATION LIST

Patent Literature

Patent Literature 1: Japanese Patent Application Laid-open Publication 2014-147884

Technical Problem

Here, in electrolysis, an ionization reaction that emits electrons occurs at an anode portion. Due to this reaction, a base material elutes from the anode portion and deterioration occurs, requiring replacement. In the hydrogen-containing water generator of Patent Literature 1, an anode portion that generates oxygen gas is provided inside, and a cathode portion that generates hydrogen gas bubbles is provided outside, and thus, it is necessary to remove the electrode unit from an electrolytic vessel and disassemble the electrode unit in order to check the deterioration of the anode portion.

For the foregoing reasons there is a need for a hydrogen-containing water generator that allows for the easy checking of the deterioration of an anode portion.

SUMMARY

A hydrogen-containing water generator according to an aspect of the present invention includes: a cathode portion of cylindrical shape that has a plurality of openings in a side thereof; an anode portion of cylindrical shape that is provided radially outside the cathode portion and has a plurality of openings in a side thereof; an electrolytic vessel that is transparent, has a cylindrical shape, and is internally provided with the cathode portion and the anode portion; a water supply part that is configured to supply water into the cathode portion from one end side of the cathode portion; and a drain part that is configured to drain water inside the electrolytic vessel from the other end side of the cathode portion.

Preferably, in the hydrogen-containing water generator, the cathode portion extends in a vertical direction, the water supply part is provided on a lower end side of the cathode portion in a vertical direction, and the drain part is provided on an upper end side of the cathode portion in a vertical direction.

Preferably, in the hydrogen-containing water generator, the water supply part is inserted inside the cathode portion in a radial direction and inserted upward so as to be above an opening on a lower end side.

Preferably, in the hydrogen-containing water generator, the drain part is inserted inside the cathode portion in a radial direction and inserted downward so as to be below an opening on an upper end side.

Preferably, the hydrogen-containing water generator includes a degassing valve that discharges gas in the electrolytic vessel.

Preferably, a spacer is arranged between an outer peripheral portion of the cathode portion and an inner peripheral portion of the anode portion.

Advantageous Effects of Invention

According to an aspect of the present invention, deterioration of the anode can be readily checked.

DESCRIPTION OF EMBODIMENTS

Hereinafter, an embodiment of a hydrogen-containing water generator 1 according to the present invention will be described in detail with reference to the drawings. In the following description of the embodiments, the same reference sign is given to the same configurations, and different reference sings are given to different configurations.

Figure 1:
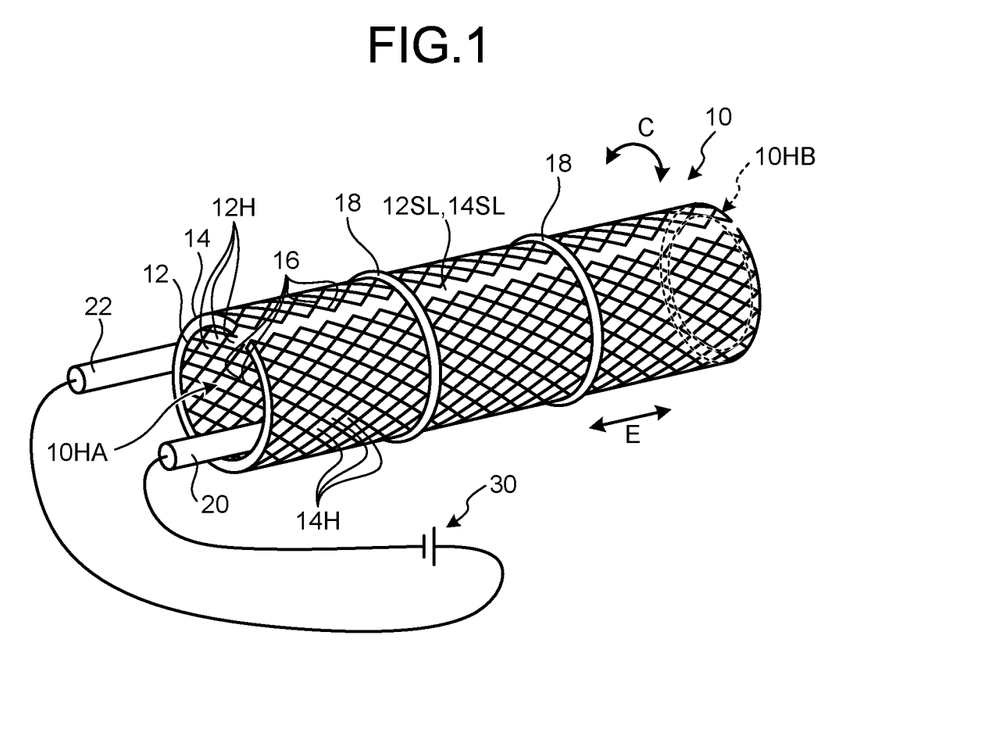
FIG. 1 is a schematic perspective view of an electrode unit of a hydrogen-containing water generator according to the present embodiment.
Figure 2:
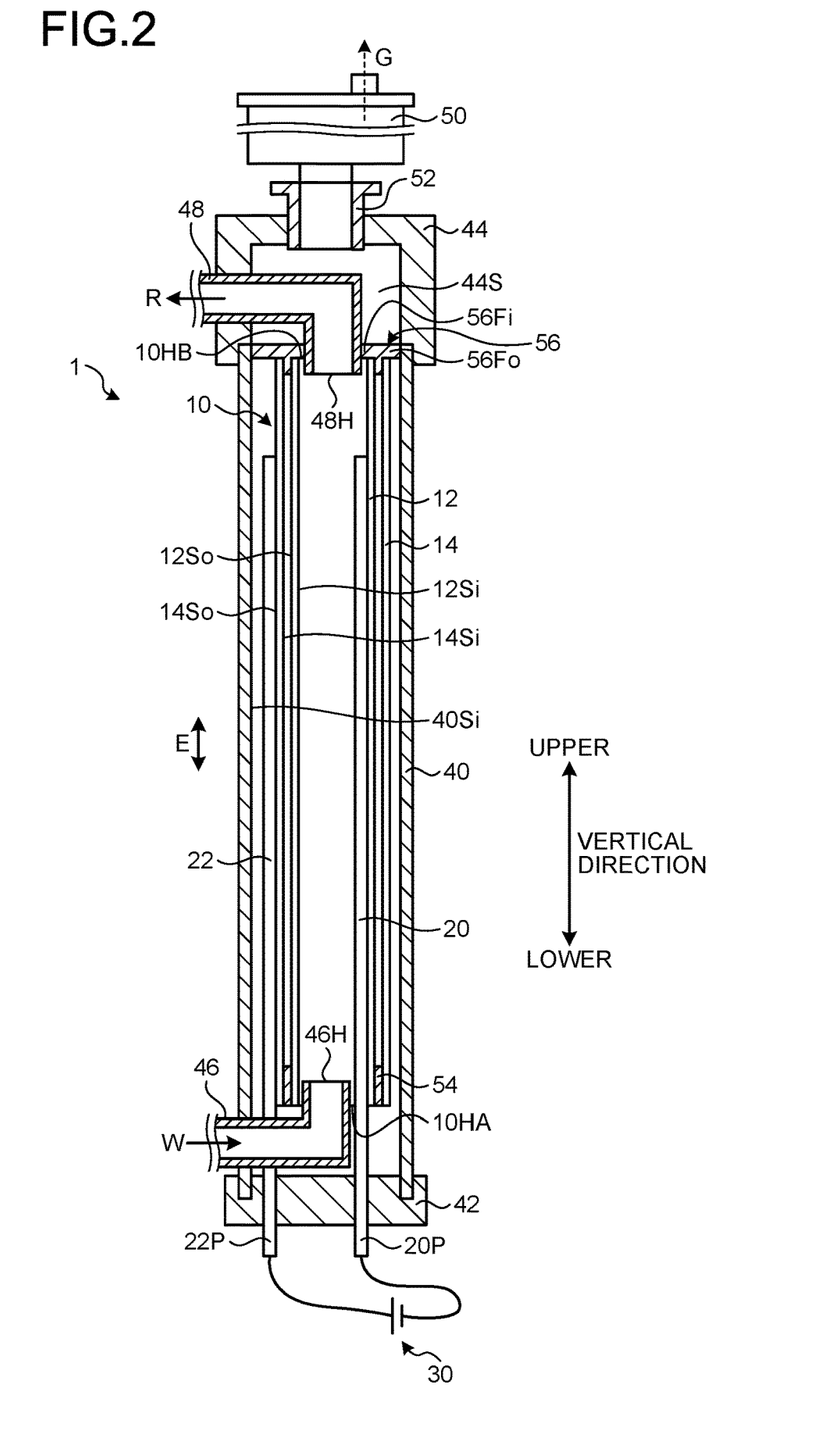
FIG. 2 is a schematic cross-sectional view of the hydrogen-containing water generator according to the present embodiment.

First, an electrode unit 10 that is used to generate hydrogen-containing water R will be described. FIG. 1 is a schematic perspective view of the electrode unit of the hydrogen-containing water generator according to the present embodiment. FIG. 2 is a schematic cross-sectional view of the hydrogen-containing water generator according to the present embodiment. The electrode unit 10 generates, by using water electrolysis action, the hydrogen-containing water R that is water containing hydrogen from raw water W such as tap water. The hydrogen-containing water R is alkaline water.

As illustrated in FIG. 1, the electrode unit 10 includes a cathode portion 12 and an anode portion 14. Both the cathode portion 12 and the anode portion 14 are cylindrical conductors. The anode portion 14 is provided concentrically outside the cathode portion 12 and is separated from the cathode portion 12. A lower end side opening 10HA and an upper end side opening 10HB as openings are provided at both ends of the electrode unit 10, more specifically, at both ends of the cathode portion 12 and the anode portion 14. The cathode portion 12 and the anode portion 14 are configured such that the distance (referred to as interelectrode space) between the cathode portion 12 and the anode portion 14 is maintained by a lower spacer 54 and an upper spacer 56 (see FIG. 2).

In the present embodiment, the interelectrode space between the cathode portion 12 and the anode portion 14 preferably falls within the range of 0.1 mm or more and 1 mm or less. The size of the interelectrode space set to the range described above enables the electrode unit 10 to generate a sufficient amount of hydrogen to generate the hydrogen-containing water R, even if voltage applied between the cathode portion 12 and the anode portion 14 has a relatively small potential difference. If the size of the interelectrode space falls within the range described above, it is possible for the electrode unit 10 to dissolve a sufficient amount of hydrogen in the raw water W to generate the hydrogen-containing water R in which a large amount of hydrogen is dissolved, even when the voltage applied to the electrode unit 10 is relatively low. Furthermore, if the amount of hydrogen dissolved in the hydrogen-containing water R is constant, the electrode unit 10 can have reduced power consumption.

In the present embodiment, the cathode portion 12 and the anode portion 14 are formed of titanium (Ti) and plated with platinum (Pt). For example, the plating may employ platinum (Pt)-iridium (Ir). In the present embodiment, titanium is pure titanium. The cathode portion 12 and the anode portion 14 are not limited to the electrode of titanium plated with platinum, but preferably employ a material that does not dissolve in the raw water W (e.g., vanadium (V)). In the present embodiment, both of the cathode portion 12 and the anode portion 14 are plated, but only the anode portion 14 may be plated and the cathode portion 12 may not be plated. Thus, the manufacturing cost of the electrode unit 10 can be reduced.

The cathode portion 12 and the anode portion 14 each include a mesh member in which a plurality of linear portions 16 that are line-shaped portions intersect each other. The cathode portion 12 has a plurality of openings 12H in the side thereof. The anode portion 14 has a plurality of openings 14H in the side thereof. A portion surrounded by the plurality of linear portions 16 is defined as each of an opening 12H of the cathode portion 12 and an opening 14H of the anode portion 14. The plurality of openings 12H included in the cathode portion 12 penetrate the side of the cathode portion 12 in a thickness direction of the cathode portion 12. The plurality of openings 14H included in the anode portion 14 penetrate the side of the anode portion 14 in a thickness direction of the anode portion 14. The shape of the linear portion 16 of each of the cathode portion 12 and the anode portion 14 will be described in detail later.

The cathode portion 12 has a slit 12SL that extends in a longitudinal direction E, that is, in a direction in which the cathode portion 12 as a cylindrical member extends. The anode portion 14 has a slit 14SL that extends in the longitudinal direction E, that is, in a direction in which the anode portion 14 as a cylindrical member extends. The electrode unit 10 includes a plurality of restraint members 18 outside the anode portion 14. Examples of each of the restraint members 18 include a resin binding band, a metal wire material, and the like. The restraint member 18 preferably employs a material that has high corrosion resistance and does not dissolve in the raw water W. The restraint member 18 closes the slit 12SL of the cathode portion 12 and the slit 14SL of the anode portion 14 to restrain the cathode portion 12 and anode portion 14, in circumferential directions of the cathode portion 12 and anode portion 14. By removing the restraint member 18, the electrode unit 10 can be readily disassembled into the cathode portion 12 and the anode portion 14, and therefore maintenance, inspection, repair or component replacement is facilitated.

Both of a cathode power supply member 20 and an anode power supply member 22 are rod-shaped conductors. The cathode power supply member 20 is electrically connected to the cathode portion 12. The cathode power supply member 20 is electrically connected to a negative electrode of a power supply 30. The anode power supply member 22 is electrically connected to the anode portion 14. The anode power supply member 22 is electrically connected to a positive electrode of the power supply 30. The power supply 30 is a direct-current power supply. With such a configuration, the cathode portion 12 is electrically connected to the negative electrode of the power supply 30 via the cathode power supply member 20, and the anode portion 14 is electrically connected to the positive electrode of the power supply 30 via the anode power supply member 22.

The cathode power supply member 20 is joined and mounted to the cathode portion 12, for example, by joining means such as welding but may use any joining means, not limited to spot welding, as long as the cathode power supply member 20 is electrically connected to the cathode portion 12. The anode power supply member 22 is joined and mounted to the anode portion 14, for example, by joining means such as welding but may use any joining means, not limited to spot welding, as long as the anode power supply member 22 is electrically connected to the anode portion 14.

In the present embodiment, the cathode power supply member 20 and the anode power supply member 22 are members formed of titanium and plated with platinum, as in the cathode portion 12 and the anode portion 14. For example, the plating may employ platinum (Pt)-iridium (Ir). The cathode power supply member 20 and the anode power supply member 22 are not limited to the member formed of titanium and plated with platinum in the same manner as the cathode portion 12 and the anode portion 14, but preferably employ a material that does not dissolve in the raw water W. In the present embodiment, the cathode portion 12 may not be plated but, in this configuration, the cathode power supply member 20 also may not be plated.

Next, the hydrogen-containing water generator 1 according to the present embodiment will be described. As illustrated in FIG. 2, the hydrogen-containing water generator 1 includes an electrolytic vessel 40, a lower base 42, an upper base 44, a water supply pipe 46, a drain pipe 48, a degassing valve 50, and a joint pipe 52.

The electrolytic vessel 40 is a transparent cylindrical vessel. The electrode unit 10 is provided inside the electrolytic vessel 40. The electrode unit 10 is arranged so that the longitudinal direction E thereof extends in the vertical direction. The transparent electrolytic vessel 40 allows the user to visually recognize the electrode unit 10, particularly the anode portion 14 provided at a position facing the electrolytic vessel 40, from outside the electrolytic vessel 40. The electrolytic vessel 40 has a lower end that is covered and secured by the lower base 42. The electrolytic vessel 40 has an upper end that is covered and secured by the upper base 44.

The lower base 42 secures the lower end of the electrolytic vessel 40, the cathode power supply member 20, and the anode power supply member 22. The cathode power supply member 20 and the anode power supply member 22 partially protrude below the lower end side opening 10HA of the cathode portion 12 and the anode portion 14. A protruding portion 20P of the cathode power supply member 20 and a protruding portion 22P of the anode power supply member 22 water-tightly penetrate the lower base 42. The lower base 42 secures the cathode portion 12 and the anode portion 14 via the cathode power supply member 20 and the anode power supply member 22. Thus, the hydrogen-containing water generator 1 can supply power to the electrode unit 10 from outside the electrolytic vessel 40 via the cathode power supply member 20 and the anode power supply member 22. Furthermore, the electrode unit 10 is secured to the lower base 42 and the electrolytic vessel 40 via the cathode power supply member 20 and the anode power supply member 22. The upper base 44 is a cylindrical base that has a closed upper end side. The upper base 44 secures the upper end of the electrolytic vessel 40. The joint pipe 52 that causes the degassing valve 50 and an internal space 44S of the upper base 44 to communicate with each other penetrates the upper end side of the upper base 44.

The water supply pipe 46 is an L-shaped pipe that supplies the raw water W to the electrolytic vessel 40. The water supply pipe 46 is provided to water-tightly penetrate a side portion of the electrolytic vessel 40. Note that, in FIG. 2, the anode power supply member 22 is illustrated on the left side of the anode portion 14, and the water supply pipe 46 and the anode power supply member 22 are illustrated overlapping each other, but the water supply pipe 46 is provided to extend to a position where the water supply pipe 46 does not overlap the cathode power supply member 20 and the anode power supply member 22. A water supply part 46H that is an opening of the water supply pipe 46 on the downstream end side is provided inside an inner peripheral portion 12Si of the cathode portion 12. The water supply part 46H supplies water vertically upward. The water supply part 46H supplies the raw water W from above the lower end side opening 10HA of the cathode portion 12.

The drain pipe 48 is an L-shaped pipe that drains the hydrogen-containing water R in the electrolytic vessel 40. The drain pipe 48 passes through the internal space 44S of the upper base 44 and water-tightly penetrates a side portion of the upper base 44. A drain part 48H that is an opening of the drain pipe 48 on the upstream end side is provided inside the inner peripheral portion 12Si of the cathode portion 12. The drain part 48H drains from above the water supply part 46H. The drain part 48H takes in the hydrogen-containing water R located below the upper end side opening 10HB of the cathode portion 12 and discharges the hydrogen-containing water R outside the electrolytic vessel 40.

The degassing valve 50 is fixed to the upper base 44 via the joint pipe 52. The degassing valve 50 communicates with the internal space 44S of the upper base 44 via the joint pipe 52. The degassing valve 50 releases gas G stored in the internal space 44S of the upper base 44. The degassing valve 50 releases the gas G when the pressure inside the internal space 44S of the upper base 44 exceeds a predetermined value. For example, the gas G contains the oxygen gas generated by a water electrolysis reaction in the electrolytic vessel 40.

As described above, the interelectrode space between the cathode portion 12 and the anode portion 14 is maintained by the lower spacer 54 and the upper spacer 56. The lower spacer 54 has a cylindrical shape and is arranged between an outer peripheral portion 12So of the cathode portion 12 and an inner peripheral portion 14Si of the anode portion 14, in the lower end side opening 10HA. The upper spacer 56 has a cylindrical shape and is arranged between the outer peripheral portion 12So of the cathode portion 12 and the inner peripheral portion 14Si of the anode portion 14, in the upper end side opening 10HB. The upper spacer 56 has an upper end at which an inner flange portion 56Fi protrudes inward. The inner flange portion 56Fi maintains a distance between the electrode unit 10 and the drain part 48H at a predetermined distance. An outer flange portion 56Fo is provided at the upper end of the upper spacer 56. The outer flange portion 56Fo is provided wholly in a circumferential direction, projecting radially outward. The outer flange portion 56Fo maintains a distance between the electrode unit 10 and an inner peripheral portion 40Si of the electrolytic vessel 40 at a predetermined distance.

Next, the electrolysis of the raw water W performed by the hydrogen-containing water generator 1 will be described. In the hydrogen-containing water generator 1, the electrode unit 10 is immersed in the raw water W, a voltage is applied to the electrode unit 10 by the power supply 30 to generate a potential difference between the cathode portion 12 and the anode portion 14, whereby the raw water W is electrolyzed, thereby generating the hydrogen-containing water R.

In the hydrogen-containing water generator 1, when a predetermined voltage is applied between the cathode portion 12 and the anode portion 14 of the electrode unit 10 from the power supply 30, a reaction represented by the following formula (1) occurs in the anode portion 14.

$$2H_2O \rightarrow O_2 + 4H^+ + 4e^- \qquad (1)$$

In the hydrogen-containing water generator 1, when a predetermined voltage is applied between the cathode portion 12 and the anode portion 14 of the electrode unit 10 from the power supply 30, a reaction represented by the following formula (2) occurs in the cathode portion 12.

$$4H^+ + 4e^- \rightarrow 2H_2 \qquad (2)$$

In the hydrogen-containing water generator 1, when a predetermined voltage is applied between the cathode portion 12 and the anode portion 14 of the electrode unit 10 from the power supply 30, a reaction represented by the following formula (3) occurs in the whole of the cathode portion 12 and the anode portion 14.

$$2H_2O \rightarrow O_2 + 2H_2 \qquad (3)$$

As described above, in the hydrogen-containing water generator 1, acid drainage is reduced, and the hydrogen-containing water R flowing out from the drain part 48H is neutral, for example, having a pH within a range of approximately 7 or greater to 7.5 or less. The oxygen gas being bubbles are attracted on the outside of the anode portion 14, moves between an outer peripheral portion 14So of the anode portion 14 and the inner peripheral portion 40Si of the electrolytic vessel 40, and is released to the outside of the hydrogen-containing water generator 1 via the internal space 44S of the upper base 44, the joint pipe 52, and the degassing valve 50.

Ionized hydrogen ions $H^+$ that are generated at the anode portion 14 are attracted to the cathode portion 12 side, and hydrogen gas bubbles are generated at the cathode portion 12. The bubbles are minute bubbles having a nanometer-scale diameter. Here, the hydrogen-containing water generator 1 causes the raw water W to be supplied from the water supply part 46H and causes the hydrogen-containing water R to drain from the drain part 48H. The water supply part 46H and the drain part 48H are provided inside the inner peripheral portion 12Si of the cathode portion 12. The raw water W flows in vertically upward from the lower end side opening 10HA, and the hydrogen-containing water R flows out from the upper end side opening 10HB. In other words, on the inside of the cathode portion 12, an upward flow of water from the lower side is generated.

The hydrogen-containing water generator 1 is configured to preferentially discharge the hydrogen-containing water R from the electrolytic vessel 40. Preferentially discharging the hydrogen-containing water R from the electrolytic vessel 40 makes it possible to reduce the amount of oxygen dissolved in the water inside the electrolytic vessel 40 and preferably generate the hydrogen-containing water R. Furthermore, the water supply part 46H supplies water vertically upward inside the inner peripheral portion 12Si of the cathode portion 12. In other words, the water supply part 46H supplies water along the longitudinal direction E of the electrode unit 10, which makes it difficult for the raw water W to collide, due to a local distribution of the raw water W supplied from the water supply part 46H toward the electrode unit 10, thereby enabling uniform electrolysis. Furthermore, the drain part 48H is configured to drain water from inside the inner peripheral portion 12Si of the cathode portion 12 above the water supply part 46H, which makes it difficult for the hydrogen-containing water R drained from the drain part 48H to generate a turbulence, due to a local distribution thereof toward the electrode unit 10, thereby enabling uniform electrolysis.

Figure 3:
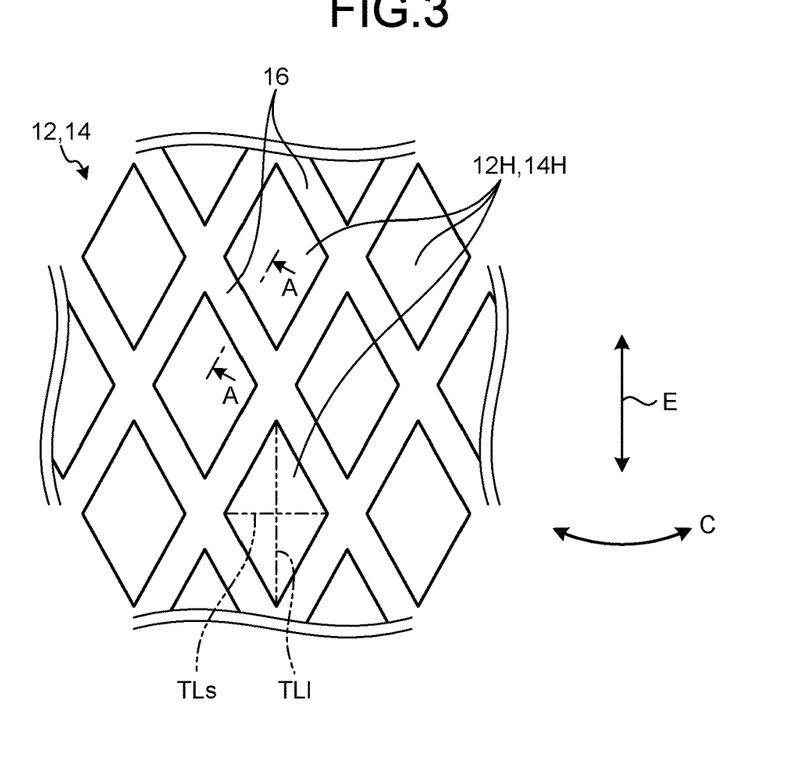
FIG. 3 is a schematic enlarged view of part of a cathode portion and anode portion according to the present embodiment.
Figure 4:
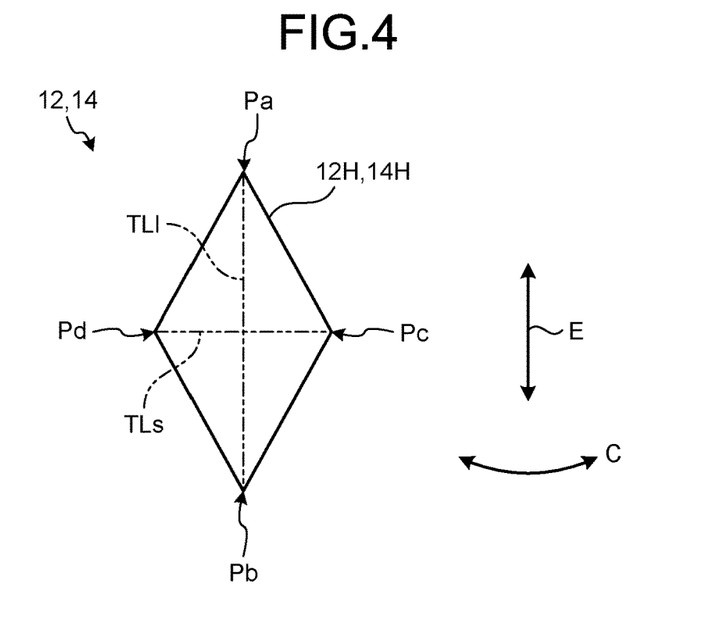
FIG. 4 is a schematic enlarged view of openings of the cathode portion and anode portion according to the present embodiment.
Figure 5:
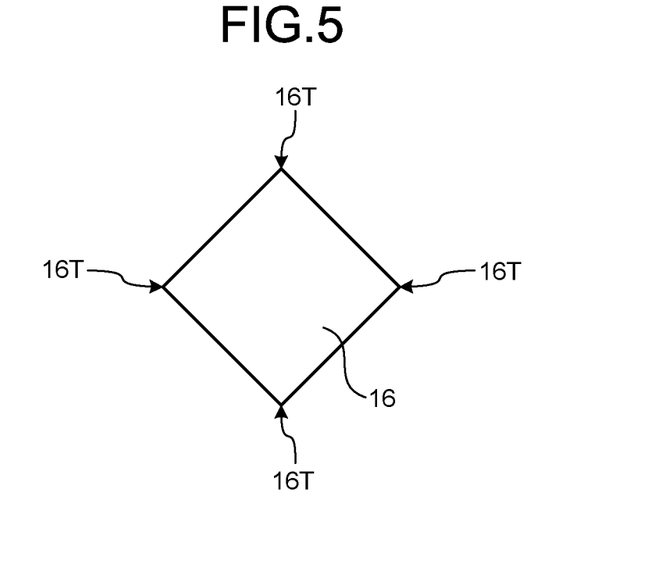
FIG. 5 is a cross-sectional view taken along the line A-A of FIG. 3.

Next, the shape of the electrode unit 10 will be described in more detail. FIG. 3 is a schematic enlarged view of part of the cathode portion and anode portion according to the present embodiment. FIG. 4 is a schematic enlarged view of openings of the cathode portion and anode portion according to the present embodiment. FIG. 5 is a cross-sectional view taken along the line A-A of FIG. 3.

As illustrated in FIGS. 3 and 4, in the present embodiment, the openings 12H of the cathode portion 12 and the openings 14H of the anode portion 14 have a rhombic shape. In each of the openings 12H and 14H, a first diagonal line TL1 that is one diagonal line, is longer than a second diagonal line TLs that is the other diagonal line. In each of the openings 12H and 14H, angles at vertices Pa and Pb on the first diagonal line TL1 are smaller than the angles at vertices Pc and Pd on the second diagonal line TLs. In the opening 12H and the opening 14H, the first diagonal line TL1 extends in a direction in which the cathode portion 12 and the anode portion 14 extend, that is, in the longitudinal direction E. The second diagonal line TLs extends in a circumferential direction C of the cathode portion 12 and anode portion 14 each having a cylindrical shape.

The cathode portion 12 has a plurality of openings 12H, and the anode portion 14 has a plurality of openings 14H, whereby the lines of electric force are allowed to extend inside and outside through the openings 12H and 14H. Thus, both surfaces of the cathode portion 12 and anode portion 14 can be used for electrolysis, and thus, hydrogen can be efficiently generated. Furthermore, each opening 12H in the cathode portion 12 is surrounded by the linear portions 16, whereby the wetting angle of a hydrogen bubble generated by the cathode portion 12 is increased, thereby enabling separation of the hydrogen bubble with its size being small. In other words, due to an attraction force generated between the generated hydrogen and a surface of the cathode portion 12, the hydrogen bubble is almost in a point contact and the surface tension is reduced, and thus, the cathode portion 12 enables the hydrogen bubbles to separate with its size being small, thereby generating the hydrogen-containing water R in which a large number of hydrogen bubbles are dissolved. Furthermore, each opening 14H in the anode portion 14 is surrounded by the linear portions 16, whereby the wetting angle of an oxygen bubble generated by the anode portion 14 is increased, thereby enabling immediate separation of the oxygen bubble. In other words, due to an attraction force generated between the generated oxygen and a surface of the anode portion 14, the oxygen bubble is almost in a point contact and the surface tension is reduced, and thus, the anode portion 14 enables the oxygen bubbles to immediately separate, efficiently releasing oxygen bubbles to the outside.

As illustrated in FIG. 5, in the present embodiment, the linear portion 16 of each of the cathode portion 12 and the anode portion 14 has a rectangular cross-section (square in the example of FIG. 5). The cathode portion 12 is configured so that a corner portion 16T of the linear portion 16 further increases the wetting angle of a hydrogen bubble, reducing the surface tension. Thus, the cathode portion 12 enables separation of the hydrogen bubble with its size being smaller, and thus the hydrogen-containing water R in which the hydrogen bubbles of smaller size are dissolved can be generated. Furthermore, the cathode portion 12 has the linear portion 16 having a rectangular cross-section, and therefore, the surface area usable for generation of hydrogen can be increased. Thus, in the cathode portion 12, the efficiency of dissolving hydrogen in the raw water W is improved. Furthermore, the anode portion 14 is configured so that a corner portion 16T of the linear portion 16 further increases the wetting angle of an oxygen bubble, reducing the surface tension. Thus, the anode portion 14 enables quick separation of the oxygen bubbles from the linear portion 16, efficiently releasing the oxygen bubbles to the outside.

Figure 6:
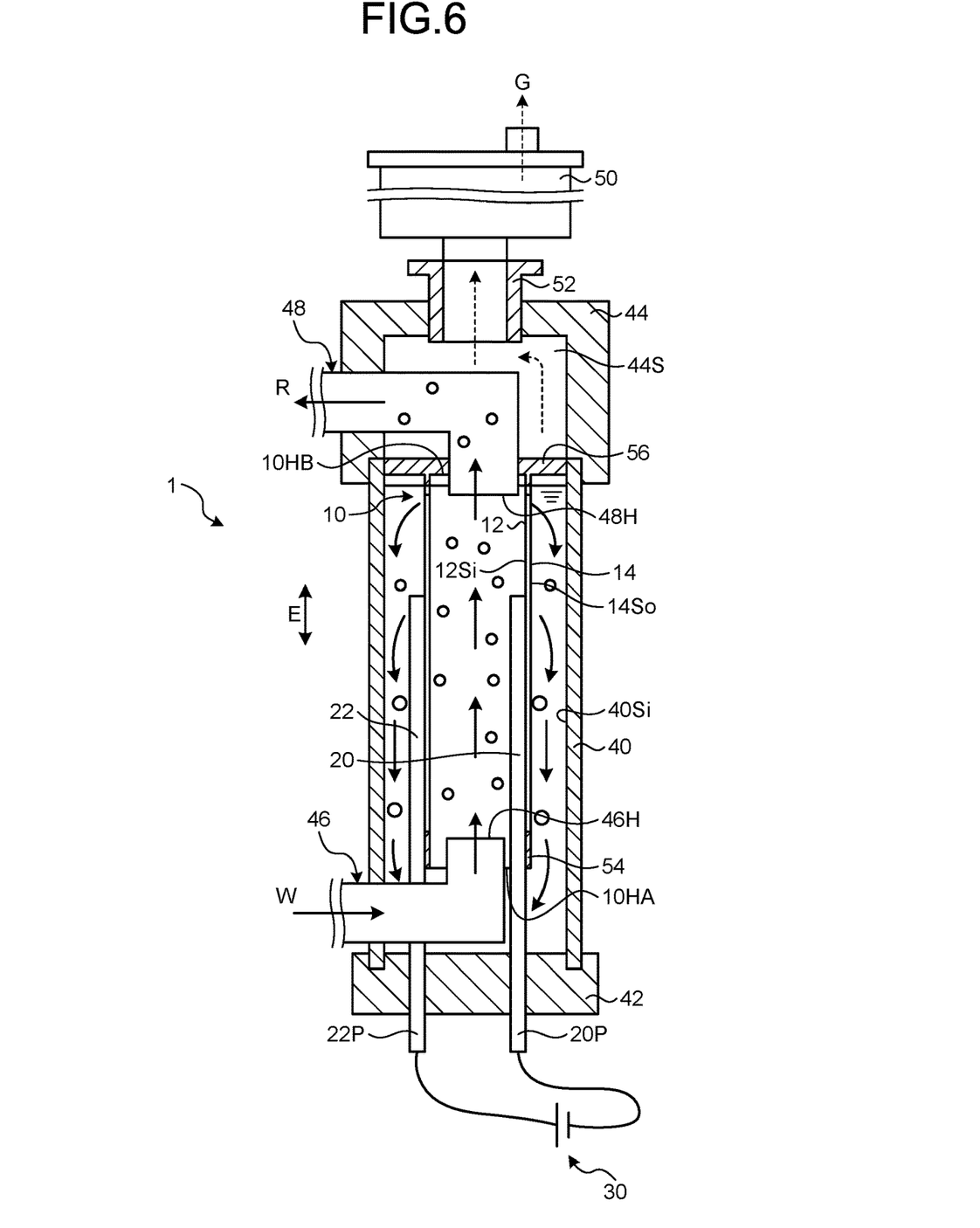
FIG. 6 is a schematic cross-sectional view of a usage state of the hydrogen-containing water generator according to the present embodiment.

Next, a detail description will be made of flows of water and bubbles in the electrolytic vessel 40 when the hydrogen-containing water R is generated by the hydrogen-containing water generator 1 according to the present embodiment. FIG. 6 is a schematic cross-sectional view of a usage state of the hydrogen-containing water generator according to the present embodiment.

The inside of the electrolytic vessel 40 is filled with the raw water W in advance. The surface of the raw water W needs to be at least above the drain part 48H. When a predetermined voltage is applied from the power supply 30, the electrolysis reaction described above occurs in the electrode unit 10. Here, when the raw water W is caused to flow in from the water supply part 46H and water in the electrolytic vessel 40 is caused to flow out from the drain part 48H, an upward flow of water from the lower side is generated inside the cathode portion 12. Water that does not flow out of the drain part 48H hits the surface of water at the upper part of the electrolytic vessel 40 and flows outside the electrode unit 10. Between the outer peripheral portion 14So of the anode portion 14 and the inner peripheral portion 40Si of the electrolytic vessel 40, a downward flow of water from the upper side is generated. In other words, inside the electrolytic vessel 40, water circulates inside and outside the electrode unit 10. The speed of water flowing upward from below inside the electrode unit 10 is higher than the speed of water flowing downward from above outside the electrode unit 10.

While passing through the inside of the cathode portion 12, the raw water W takes in hydrogen gas bubbles generated at the cathode portion 12 by electrolysis, becomes the hydrogen-containing water R, and flows out from the drain part 48H. Oxygen gas bubbles generated at the anode portion 14 remain or move downward between the outer peripheral portion 14So of the anode portion 14 and the inner peripheral portion 40Si of the electrolytic vessel 40, by the downward flow of water from the upper side. When the oxygen gas bubbles are combined and grow larger, the bubbles rise upward against the flow of water and are discharged from the surface of water. The oxygen gas discharged from the surface of water is stored in the internal space 44S of the upper base 44. When the pressure inside the internal space 44S exceeds a predetermined value, the gas G containing the oxygen gas is released to the outside of the hydrogen-containing water generator 1 via the joint pipe 52 and the degassing valve 50.

As described above, the hydrogen-containing water generator 1 according to the present embodiment includes the cathode portion 12 of cylindrical shape that has the plurality of openings 12H in the side thereof, the anode portion 14 of cylindrical shape that is provided radially outside the cathode portion 12 and has the plurality of openings 14H in the side thereof, and the electrolytic vessel 40 that is transparent, has a cylindrical shape, and is internally provided with the cathode portion 12 and the anode portion 14, whereby a user can visually check the anode portion 14 from the outer periphery of the electrolytic vessel 40. In other words, the user can readily check the deterioration of the anode portion 14. This configuration makes it possible for the user to replace the electrode unit 10, in particular the anode portion 14, at appropriate timing, thus, preventing the hydrogen-containing water generator 1 from being brought to a halt, which would otherwise occur due to a failure of the electrode unit 10. Furthermore, the anode portion 14 provided outside the cathode portion 12 has a diameter, or a surface area, that is larger than that of a conventional configuration in which the anode portion 14 is provided inside the cathode portion 12, and thus, the current density is reduced and the durability of the anode portion 14 is improved.

Furthermore, the hydrogen-containing water generator 1 according to the present embodiment includes the water supply part 46H that supplies water into the cathode portion 12 from one end side of the cathode portion (the lower end side opening 10HA), and the drain part 48H that drains water (the hydrogen-containing water R) inside the electrolytic vessel 40 from the other end side (the upper end side opening 10HB) of the cathode portion 12, and thus, a flow of water from one side to the other side is formed inside the cathode portion 12 where the hydrogen gas is generated. Thus, the hydrogen-containing water R can be preferentially discharged from the electrolytic vessel 40, and it is possible to reduce the amount of oxygen dissolved in the water inside the electrolytic vessel 40 and preferably generate the hydrogen-containing water R.

Furthermore, the cathode portion 12 extends in the vertical direction, the water supply part 46H is provided on a lower end side of the cathode portion 12 in the vertical direction, the drain part 48H is provided on an upper end side of the cathode portion 12 in the vertical direction, whereby the upward flow of water from the lower side is generated inside the cathode portion 12. Thus, the hydrogen-containing water R can be preferentially discharged from the electrolytic vessel 40, and it is possible to reduce the amount of oxygen dissolved in the water inside the electrolytic vessel 40 and preferably generate the hydrogen-containing water R.

Furthermore, the water supply part 46H is inserted inside the cathode portion 12 in a radial direction and inserted upward so as to be above the opening on the lower end side (lower end side opening 10HA), thereby the upward flow of water from the lower side is suitably generated inside the cathode portion 12, and the hydrogen-containing water R can be preferentially discharged from the electrolytic vessel 40.

Furthermore, the drain part 48H is inserted inside the cathode portion 12 in a radial direction and inserted downward so as to be below the opening on the upper end side (upper end side opening 10HB), thereby the upward flow of water from the lower side is more suitably generated inside the cathode portion 12, and the hydrogen-containing water R can be preferentially discharged from the electrolytic vessel 40.

Furthermore, the degassing valve 50 is provided to discharge the gas G in the electrolytic vessel 40, whereby the oxygen gas generated in the anode portion 14 can be suitably discharged to the outside.

Furthermore, the spacers (the lower spacer 54 and the upper spacer 56) are arranged between the outer peripheral portion 12So of the cathode portion 12 and the inner peripheral portion 14Si of the anode portion 14, whereby the interelectrode space that is the distance between the cathode portion 12 and the anode portion 14 is preferably maintained.

Figure 7:
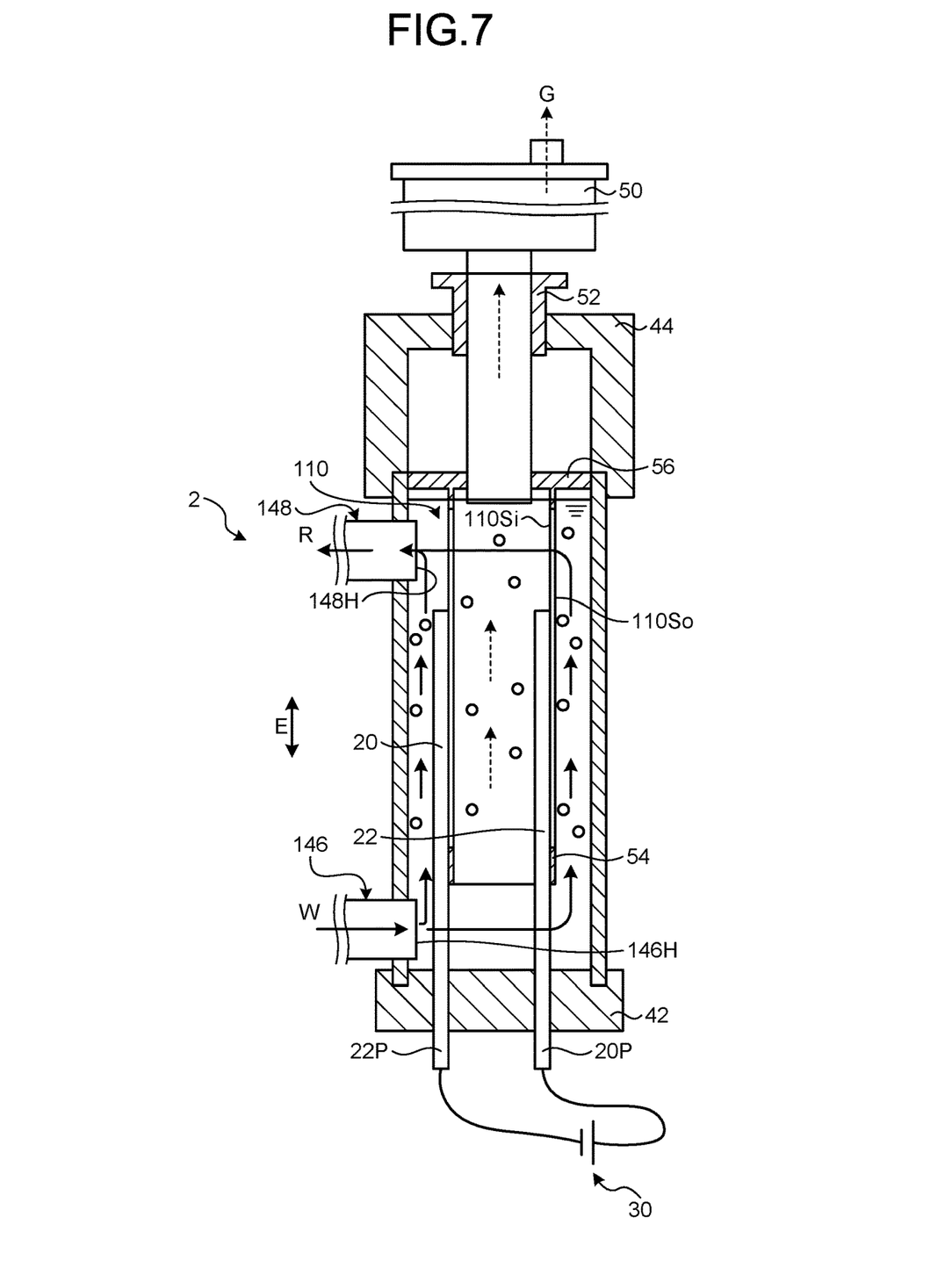
FIG. 7 is a schematic cross-sectional view of a usage state of a hydrogen-containing water generator according to a comparative embodiment.
Figure 8:
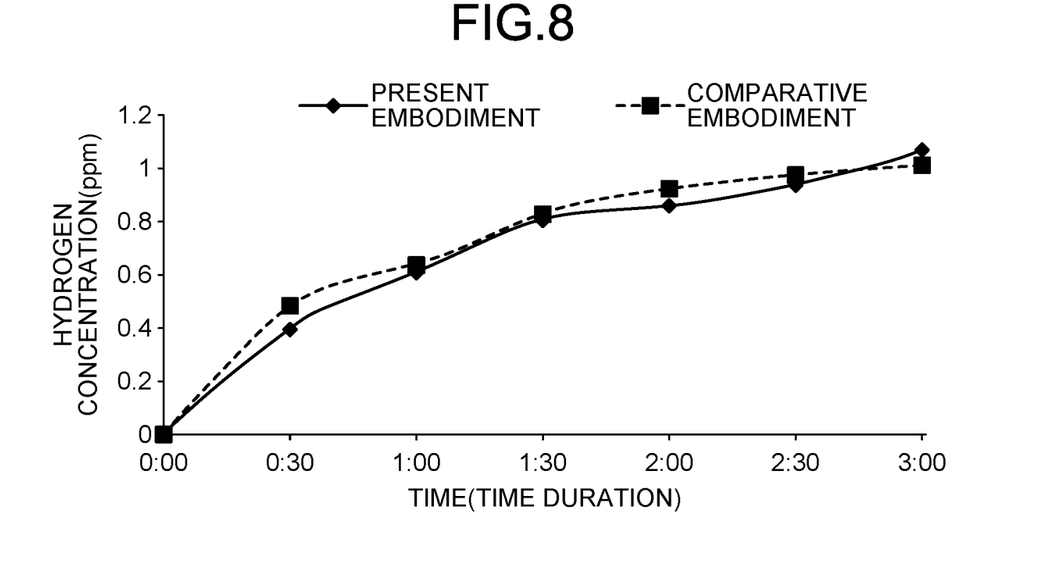
FIG. 8 is a graph illustrating hydrogen concentration in a comparative test.
Figure 9:
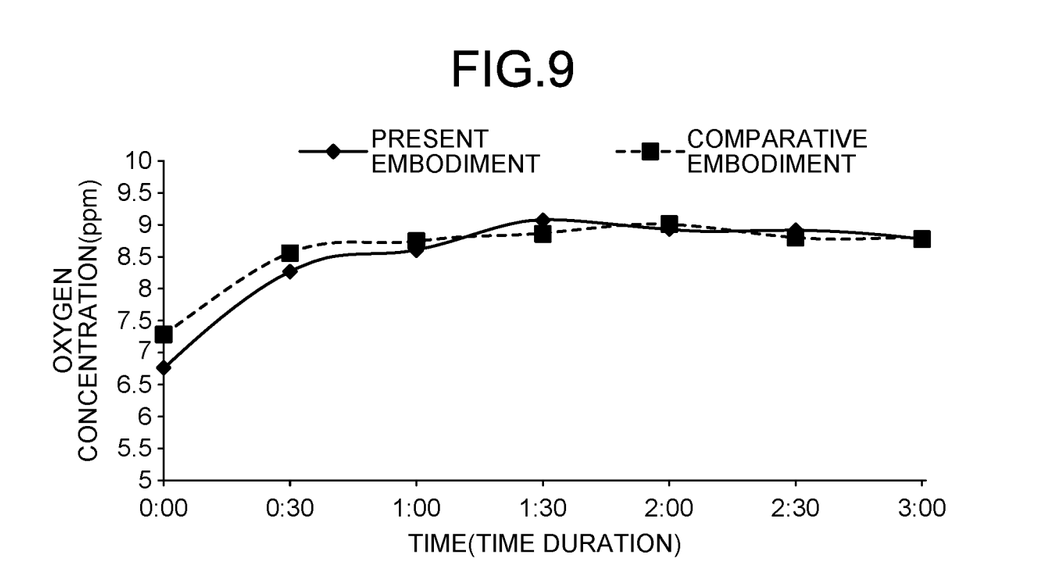
FIG. 9 is a graph illustrating oxygen concentration in a comparative test.
Figure 10:
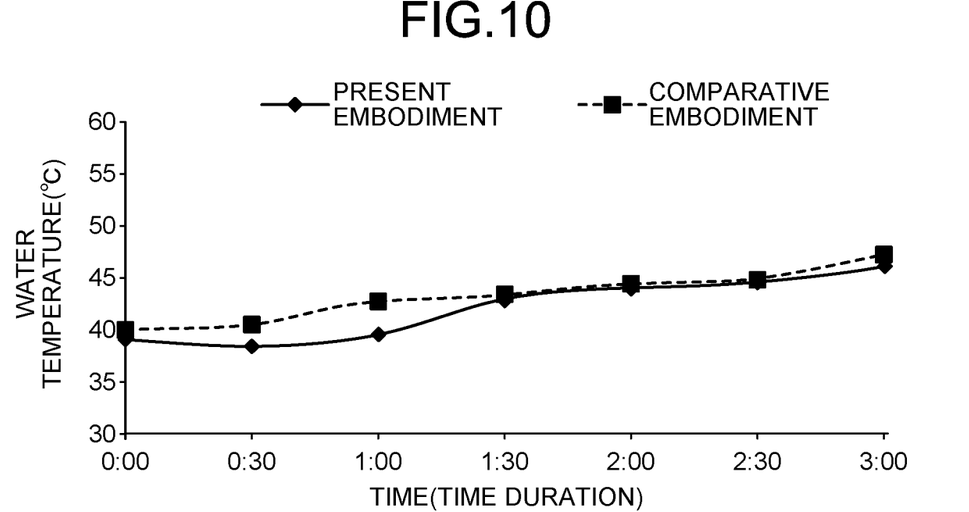
FIG. 10 is a graph illustrating water temperature in a comparative test.

Next, the effects of providing the anode portion 14 outside the cathode portion 12, not providing the anode portion inside the cathode portion as in a conventional hydrogen-containing water generator will be verified. In other words, hydrogen concentration, oxygen concentration, and water temperature of the hydrogen-containing water R are compared between the hydrogen-containing water generator 1 according to the present embodiment and a hydrogen-containing water generator 2 according to a comparative embodiment in which an anode portion is provided inside a cathode portion. FIG. 7 is a schematic cross-sectional view of a usage state of the hydrogen-containing water generator according to the comparative embodiment. FIG. 8 is a graph illustrating hydrogen concentration in a comparative test. FIG. 9 is a graph illustrating oxygen concentration in a comparative test. FIG. 10 is a graph illustrating water temperature in a comparative test.

In the hydrogen-containing water generator 2 according to the comparative embodiment illustrated in FIG. 7, a direct-current voltage is applied in a direction opposite to that in the hydrogen-containing water generator 1 according to the embodiment (see FIG. 6). In other words, an electrode unit 110 has the anode portion on the inside and the cathode portion on the outside. A cathode power supply member 20 is secured on an outer peripheral portion 110So of the electrode unit 110. An anode power supply member 22 is secured on an inner peripheral portion 110Si of the electrode unit 110.

A water supply pipe 146 is an I-shaped pipe. The water supply pipe 146 is provided to water-tightly penetrate a side portion of an electrolytic vessel 40. A water supply part 146H that is an opening of the water supply pipe 146 on the downstream end side is provided outside the outer peripheral portion 110So of the electrode unit 110. The water supply part 146H supplies raw water W toward the inner peripheral side.

A drain pipe 148 is an I-shaped pipe. The drain pipe 148 is provided to water-tightly penetrate a side portion of the electrolytic vessel 40. A drain part 148H that is an opening of the drain pipe 148 on the upstream end side is provided outside the outer peripheral portion 110So of the electrode unit 110. The drain pipe 148 drains hydrogen-containing water R toward the outer peripheral side.

When a predetermined voltage is applied from a power supply 30, a hydrogen gas is generated at the cathode portion, that is, at the outer peripheral portion 110So of the electrode unit 110. An oxygen gas is generated at the anode portion, that is, at the inner peripheral portion 110Si of the electrode unit 110.

A degassing valve 50 communicates with the inside of the electrode unit 110 via the joint pipe 52. The degassing valve 50 releases gas G containing the oxygen gas generated by a water electrolysis reaction in the electrolytic vessel 40. Such a configuration makes it possible for the hydrogen-containing water generator 2 to preferentially discharge the oxygen gas from the electrolytic vessel 40. Preferentially discharging the oxygen gas from the electrolytic vessel 40 makes it possible to reduce the amount of oxygen dissolved in the water inside the electrolytic vessel 40 and generate the hydrogen-containing water R. In the electrolytic vessel 40 of the hydrogen-containing water generator 2, an upward flow of water from the lower side is generated both inside and outside the electrode unit 110. In other words, in the electrolytic vessel 40 of the hydrogen-containing water generator 2, water circulation does not occur inside and outside the electrode unit 110, unlike in the hydrogen-containing water generator 1.

FIGS. 8, 9 and 10 illustrate the hydrogen concentrations (ppm), oxygen concentrations (ppm), and water temperatures (° C.) of the hydrogen-containing water R discharged from the drain pipe 48 of the hydrogen-containing water generator 1 and the drain pipe 148 of the hydrogen-containing water generator 2. As illustrated in FIG. 8, when the anode portion 14 is provided outside the cathode portion 12, the hydrogen concentration immediately after the start of the test is lower than that when the anode portion is provided inside the cathode portion, but the final hydrogen concentration is substantially equal to that when the anode portion is provided inside the cathode portion. As illustrated in FIG. 9, when the anode portion 14 is provided outside the cathode portion 12, the oxygen concentration immediately after the start of the test is lower than that when the anode portion is provided inside the cathode portion, but the final oxygen concentration is substantially equal to that when the anode portion is provided inside the cathode portion. As illustrated in FIG. 10, when the anode portion 14 is provided outside the cathode portion 12, the water temperature immediately after the start of the test is lower than that when the anode portion is provided inside the cathode portion, but the final water temperature is substantially equal to that when the anode portion is provided inside the cathode portion.

As described above, the hydrogen-containing water generator 1 according to the present embodiment has substantially equal performance to that of the hydrogen-containing water generator 2. As well as having substantially equal performance to that of the hydrogen-containing water generator 2, the hydrogen-containing water generator 1 allows for easy checking of deterioration of the anode portion 14.

In the present embodiment, each of the cathode portion 12, the anode portion 14, and the electrolytic vessel 40 has a cylindrical shape, but the shape thereof is not limited to the cylindrical shape, and any tubular shape may be employed. Furthermore, the electrode unit 10 may not have the lower end side opening 10HA or the upper end side opening 10HB, or may have only one of the lower end side opening 10HA and the upper end side opening 10HB. When the lower end side opening 10HA is not provided, the water supply part 46H supplies the raw water W vertically upward toward the lower end of the electrode unit 10. The raw water W passes through the openings 12H and 14H and flows into the cathode portion 12.

In the present embodiment, the electrode unit 10 is secured to the lower base 42 and the electrolytic vessel 40 via the cathode power supply member 20 and the anode power supply member 22, but the securing method is not particularly limited to this. Furthermore, in the present embodiment, the cathode portion 12, anode portion 14, and electrolytic vessel 40 that have a tubular shape are arranged in directions in which the axes thereof are parallel to the vertical direction, whereby the flow of water in the electrolytic vessel 40 is preferably controlled and the hydrogen-containing water R can be preferably discharged. Note that the directions of the cathode portion 12, anode portion 14, and electrolytic vessel 40 are not limited to the directions in which the axes thereof are parallel to the vertical direction but are preferably arranged axially.

In the present embodiment, the cathode power supply member 20 has an end on a side opposite to the protruding portion 20P, and the end extends to the vicinity of the upper end side opening 10HB, but a portion of the cathode power supply member 20 that is mounted on the cathode portion 12 may have a length being half or less of a dimension of the cathode portion 12 in the longitudinal direction E. The anode power supply member 22 has an end on a side opposite to the protruding portion 22P, and the end extends to the vicinity of the upper end side opening 10HB, but a portion of the anode power supply member 22 that is mounted on the anode portion 14 may have a length being half or less of a dimension of the anode portion 14 in the longitudinal direction E. In these configurations, for example, the electrode unit 10 may be provided with a cathode support member having the same shape as the cathode power supply member 20 on a side opposite to the side on which the cathode power supply member 20 is provided. Furthermore, the electrode unit 10 may be provided with an anode support member having the same shape as the anode power supply member 22 on a side opposite to the side on which the anode power supply member 22 is provided. The anode support member and the cathode support member may include the same material as the cathode power supply member 20 and the anode power supply member 22 or may include different materials therefrom.

The cathode power supply member 20 may not have the rod shape as described in the present embodiment but may have any shape. Furthermore, the connection portion at which the cathode power supply member 20 is connected to the cathode portion 12 is not limited to the lower end side opening 10HA but to any portion as long as the cathode power supply member 20 is electrically connected as a conductor to the cathode portion 12. The anode power supply member 22 may not have the rod shape as described in the present embodiment but may have any shape. Furthermore, the connection portion at which the anode power supply member 22 is connected to the anode portion 14 is not limited to the lower end side opening 10HA but to any portion as long as the anode power supply member 22 is electrically connected as a conductor to the anode portion 14.

In the present embodiment, the water supply pipe 46 is an L-shaped pipe penetrating a side portion of the electrolytic vessel 40 but may be an I-shaped pipe penetrating the lower base 42. The water supply pipe 46 may have any shape as long as the water supply part 46H that is an opening on the downstream end side supplies water vertically upward inside the inner peripheral portion 12Si of the cathode portion 12. Furthermore, the drain pipe 48 is an L-shaped pipe penetrating a side portion of the upper base 44 but may be an I-shaped pipe penetrating an upper portion of the upper base 44. The drain pipe 48 may have any shape as long as the drain part 48H that is an opening on the upstream end side drains water from inside the inner peripheral portion 12Si of the cathode portion 12 and from above the water supply part 46H. Furthermore, the joint pipe 52 may be provided at any position and have any shape as long as the degassing valve 50 and the internal space 44S of the upper base 44 communicate with each other. In a case where the drain pipe 48 is an I-shaped pipe provided penetrating an upper portion of the upper base 44, the joint pipe 52 may be provided at a position where the joint pipe 52 does not overlap the drain pipe 48 at the upper portion of the upper base 44. Furthermore, the upper base 44 may be provided integrally with the upper spacer 56.

In the present embodiment, the cathode portion 12 and the anode portion 14 are provided to be separate from each other via the lower spacer 54 and the upper spacer 56, but a cylindrical insulator that has a plurality of openings in the side thereof may be interposed between the cathode portion 12 and the anode portion 14. The insulator, for example, is in contact with the outer peripheral portion 12So of the cathode portion 12 and the inner peripheral portion 14Si of the anode portion 14.

Although the present embodiment has been described above, the present invention is not limited to the present embodiment. Furthermore, the components described above include components readily conceived by those skilled in the art and components substantially identical, so-called equivalents. Furthermore, the components described above can be combined as appropriate. Furthermore, various omissions, substitutions, or modifications of components may be made without departing from the spirit and scope of the present embodiments.

The invention claimed is:

1. A hydrogen-containing water generator comprising:
a cathode portion that has a cylindrical shape and extends in a vertical direction, the cathode portion having a plurality of openings in a side thereof;
an anode portion that has a cylindrical shape, is provided radially outside the cathode portion, and has a plurality of openings in a side thereof;
an electrolytic vessel that is transparent, has a cylindrical shape, and is internally provided with the cathode portion and the anode portion;
a water supply part that is provided radially inside the cathode portion and that is above a lower opening on a lower end side of the cathode portion in the vertical direction, the water supply part being configured to supply water into the cathode portion from the lower opening on the lower end side of the cathode portion;
a drain part that is provided radially inside the cathode portion and that is below an upper opening on an upper end side of the cathode portion in the vertical direction, the drain part being configured to drain water inside the electrolytic vessel from the upper opening on the upper end side of the cathode portion;
a lower spacer arranged between an inner peripheral portion of the anode portion and an outer peripheral portion of the cathode portion at the lower opening;
an upper spacer arranged between the inner peripheral portion of the anode portion and the outer peripheral portion of the cathode portion at the upper opening, the upper spacer including;
an inner flange portion protruding radially inward and maintaining a distance between an inner peripheral portion of the cathode portion and an outer peripheral portion of the drain part at a predetermined distance;
an outer flange portion projecting radially outward and maintaining a distance between an outer peripheral portion of the anode portion and an inner peripheral portion of the electrolytic vessel at a predetermined distance; and
a space provided between an outer peripheral portion of the water supply part and the inner peripheral portion of the cathode portion,
wherein
the inner flange portion and the outer flange portion are above the drain part,
an upper end of the cathode portion and an upper end of the anode portion are above the drain part, and
water flow, radially outside the outer peripheral portion of the anode portion, is downward.

2. The hydrogen-containing water generator according to claim 1, further comprising a degassing valve that discharges gas in the electrolytic vessel.

* * * * *